United States Patent
Kurata

(10) Patent No.: US 7,347,295 B2
(45) Date of Patent: Mar. 25, 2008

(54) TIRE WHEEL STRUCTURE

(75) Inventor: Fumito Kurata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 205 days.

(21) Appl. No.: 10/932,115

(22) Filed: Sep. 2, 2004

(65) Prior Publication Data

US 2005/0056471 A1 Mar. 17, 2005

(30) Foreign Application Priority Data

Sep. 12, 2003 (JP) ............................. 2003-320624

(51) Int. Cl.
*B60K 7/00* (2006.01)
(52) U.S. Cl. .................................................. 180/65.5
(58) Field of Classification Search ............... 180/65.5, 180/65.6; 280/93.512, 124.141, 124.134, 280/124.145
See application file for complete search history.

(56) References Cited

U.S. PATENT DOCUMENTS

| 5,087,229 A | * | 2/1992 | Hewko et al. ............... 475/149 |
| 5,127,485 A | * | 7/1992 | Wakuta et al. .............. 180/65.5 |
| 5,180,180 A | * | 1/1993 | Yamashita et al. ........... 180/253 |

FOREIGN PATENT DOCUMENTS

| JP | A 5-278476 | | 10/1993 |
| JP | A 6-48192 | | 2/1994 |
| JP | A 9-132040 | | 5/1997 |
| JP | 2000-343920 | * | 12/2000 |
| JP | 2004-161157 | * | 6/2004 |
| WO | WO 02/083446 A1 | | 10/2002 |

OTHER PUBLICATIONS

"Instructions for repairing a flexible disk", Mar. 10, 2003.
"Traffic ABC" Hardy Disk, Dec. 18, 2005.

* cited by examiner

*Primary Examiner*—Lesley D. Morris
*Assistant Examiner*—Bridget Avery
(74) *Attorney, Agent, or Firm*—Oliff & Berridge, PLC

(57) ABSTRACT

A tire wheel structure that avoids the adverse effect of the increase in the unsprung mass associated with the presence of a driving motor at the time of a road surface input to a tire wheel is provided. In the tire wheel structure, the driving motor is disposed near the tire wheel that is supported on a vehicle body. The driving motor drives the tire wheel by transferring driving force to the tire wheel. The output shaft of the driving motor is connected to a wheel of the tire wheel via a flexible coupling. The driving motor is supported by a knuckle member of a suspension via coil springs and absorbers so that the driving motor is relatively displaceable with respect to the tire wheel.

8 Claims, 6 Drawing Sheets

TIRE WHEEL STRUCTURE

INCORPORATION BY REFERENCE

The disclosure of Japanese Patent Application No. 2003-320624 filed on Sep. 12, 2003, including the specification, drawings and abstract is incorporated herein by reference in its entirety.

BACKGROUND OF THE INVENTION

1. Field of the Invention

The invention relates to a tire wheel structure and, more particularly, to a tire wheel structure equipped with a driving motor that is disposed near a tire wheel supported on a vehicle body and that drives the tire wheel by transferring driving force to the tire wheel.

2. Description of the Related Art

Japanese Patent Application Laid-Open Publication No. 6-48192 discloses a related-art tire wheel structure in which a driving motor for rotating a tire wheel is disposed within a wheel of the tire wheel. In this tire wheel structure, a drive shaft of the driving motor is connected to the wheel. Therefore, the tire wheel can be rotated by the torque generated by the driving motor.

In a construction in which the drive shaft of the driving motor is connected to the wheel and the tire wheel is rotated by the driving motor, the mass of the driving motor adds to the unsprung mass of the vehicle. In the aforementioned related-art tire wheel structure, the drive shaft of the driving motor is directly coupled to the wheel so that the driving motor and the tire wheel are integrally fixed to each other. In this structure, therefore, the driving motor is displaced together with the tire wheel as one unit with respect to the vehicle body, at the time of input of a road surface condition to the tire wheel. Thus, an adverse effect of the added unsprung mass becomes conspicuous. Specifically, the road following performance of the tire wheel during running of the vehicle deteriorates, and the passenger riding comfort degrades.

SUMMARY OF THE INVENTION

As an embodiment of the invention, there is provided a tire wheel structure capable of avoiding the adverse effect of an increase in the unsprung mass associated with the presence of a driving motor at the time of a road surface input to the tire wheel. This tire wheel structure includes a tire wheel supported by a vehicle body, and a driving motor that is disposed near the tire wheel and is supported on the tire wheel via a spring element and a damper element so as to be relatively displaceable with respect to the tire wheel, and that drives the tire wheel by transferring driving force to the tire wheel.

According to this tire wheel structure, the driving motor for driving the tire wheel is supported so as to be relatively displaceable with respect to the tire wheel. Therefore, since the driving motor does not move together with the tire wheel as one unit but is relatively displaceable with respect to the tire wheel, the tire wheel structure avoids, as much as possible, the effect of the increase in the unsprung mass of the vehicle associated with the presence of the driving motor at the time of a road surface input to the tire wheel. Furthermore, since the effect of the increase in the unsprung mass of the vehicle associated with the presence of the driving motor can be avoided at the time of a road surface input to the tire wheel, degradation of passenger riding comfort can be prevented. In the tire wheel structure, the driving motor can be caused to function as a dynamic damper. Hence, the vibrations on the tire wheel can be reduced, and the passenger riding comfort can be improved.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description, the present invention will be described in more detail in terms of exemplary embodiments.

A first embodiment of the invention will next be described.

Figure 1:
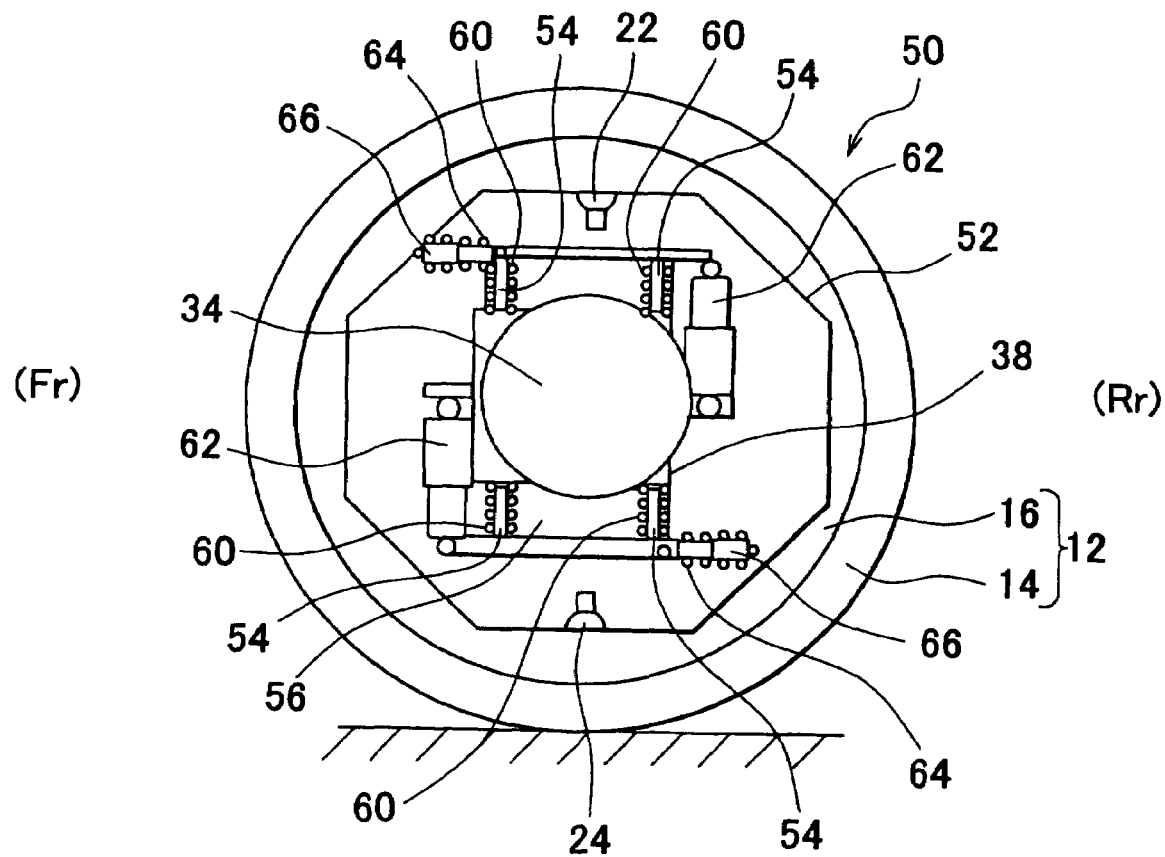
FIG. 1 is a diagram illustrating a construction of a tire wheel structure in accordance with a first embodiment of the invention, viewed from a side of a vehicle.
Figure 2:
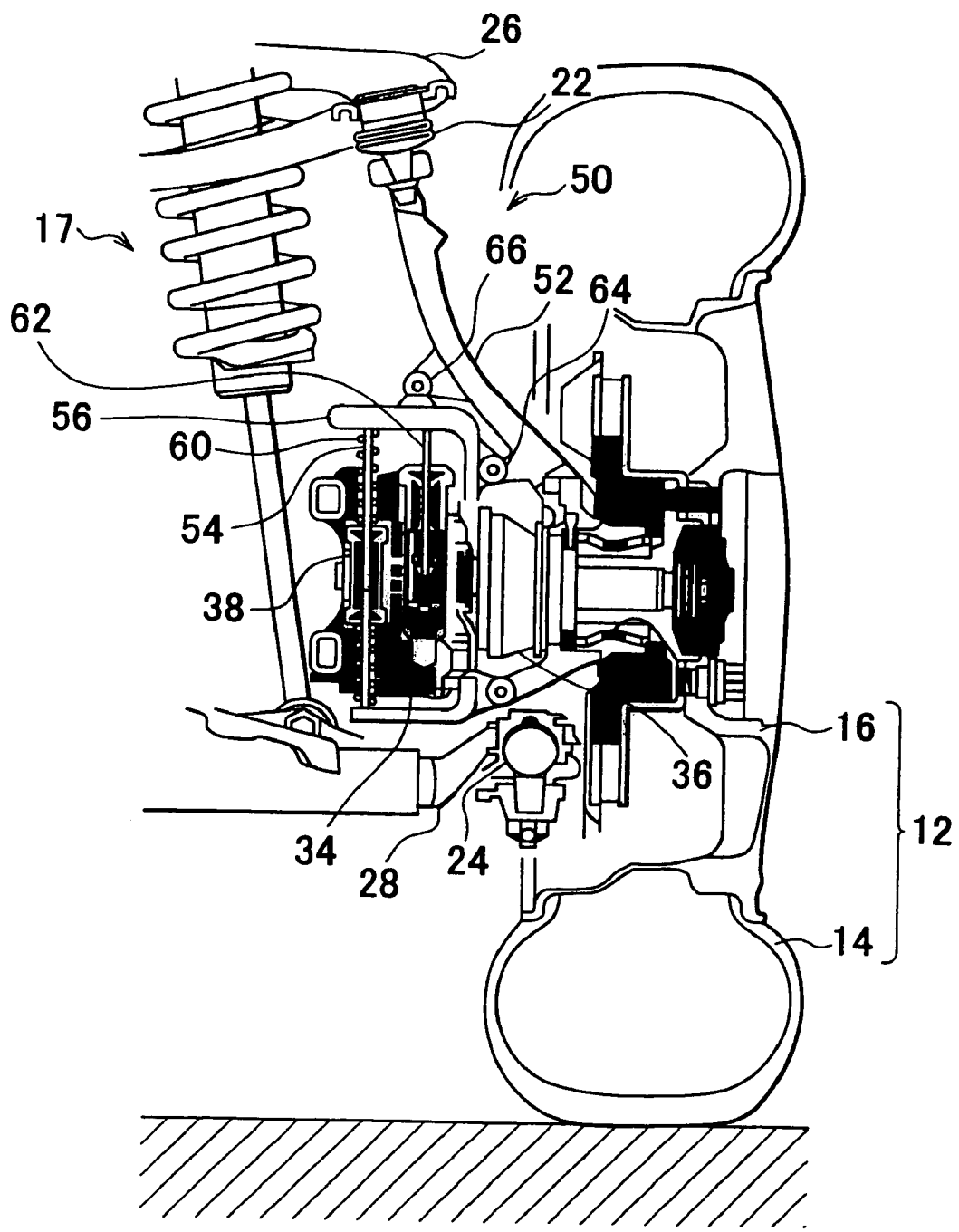
FIG. 2 is a diagram illustrating a construction of the tire wheel structure of the embodiment, viewed from a front of the vehicle.

FIGS. 1 and 2 show diagrams illustrating a tire wheel structure 50 in accordance with the first embodiment. FIG. 1 shows a view of the tire wheel structure 50 of the first embodiment taken from a side of a vehicle. FIG. 2 shows a view of the tire wheel structure 50 of the first embodiment taken from a front of the vehicle.

In this embodiment, the vehicle is equipped with the tire wheel structure 10 that includes a tire wheel 12 that is rotated and steered. The tire wheel 12 includes a rubber-made tire 14 that contacts a road surface, and a wheel 16 around which the tire 14 is mounted. A double-wishbone suspension 17 is interposed between the tire wheel 12 and the vehicle body.

In this embodiment, a vehicle is equipped with a tire wheel structure 50 that includes a tire wheel 12 that is rotated and steered. In the tire wheel structure 50, a wheel 16 of the tire wheel 12 is rotatably supported by an outer knuckle member 52. The outer knuckle member 52 is supported for oscillating movements by suspension arms 26, 28 via suspension ball joints 22, 24.

The tire wheel structure 50 of this embodiment has a driving motor 34 that drives the tire wheel 12 by transferring driving force to the tire wheel 12. A motor mount 38 to which the driving motor 34 is fixed is movably retained by an inner knuckle member 56 via rod-shaped guides 54. Each guide 54 has an axis that extends in a vertical axis direction (vehicular up-down direction). Coil springs 60 and absorbers 62 are provided as spring elements and damper elements, respectively, between the motor mount 38 and the inner knuckle member 56. The coil springs 60 extend along the guides 54, that is, in the up-down direction. Each coil spring 60 extends surrounding a corresponding guide 54. Each coil spring 60 has an elasticity in the up-down direction. The absorbers 62 extend parallel to the guides 54, that is, extend in the up-down direction. The absorbers 62 damp vibrations in the up-down direction. Therefore, the motor mount 38 and the driving motor 34 can be relatively displaced in the up-down direction with respect to the inner knuckle member 56.

Furthermore, coil springs 64 and absorbers 66 are provided as spring elements and damper elements between the inner knuckle member 56 and the outer knuckle member 52. Each coil spring 64 extends in a direction perpendicular to the guides 54, that is, a vehicular front-rear direction (horizontal direction), and has an elasticity in the vehicular front-rear direction. Each absorber 66 extends in a direction perpendicular to the guides 54, that is, a vehicular front-rear direction, and has a characteristic of damping vibrations in the vehicular front-rear direction. Therefore, the inner knuckle member 56 and the outer knuckle member 52 are relatively displaceable with respect to each other in the vehicular front-rear direction.

Hereinafter, each coil spring 60 will be referred to as "up-down direction coil spring 60", and each absorber 62 will be referred to as "up-down direction absorber 62". Furthermore, each coil spring 64 will be referred to as "front-rear direction coil spring 64", and each absorber 66 will be referred to as "front-rear direction absorber 66".

The motor mount 38 and the driving motor 34 in the tire wheel structure 50 are elastically supported by the outer knuckle member 52, that is, by the tire wheel 12 integrated with the outer knuckle member 52, via the up-down direction spring and damper elements and the vehicular front-rear direction spring and damper elements. Therefore, the motor mount 38 and the driving motor 34 are relatively displaceable in the up-down direction and the vehicular front-rear direction with respect to the tire wheel 12 and the suspension (axle) 17 that includes the outer knuckle member 52.

In this construction, the driving motor 34 functions as a dynamic damper with regard to the input to the tire wheel 12 from the road surface or the like. Specifically, when the tire wheel 12 moves up and down with respect to the vehicle body, the driving motor 34 is caused to oscillate together with the motor mount 38 as one unit in the up-down direction, and therefore functions as a dynamic damper in the up-down direction via the up-down direction coil springs 60 and the up-down direction absorbers 62. When the tire wheel 12 is displaced in the vehicular front-rear direction with respect to the vehicle body, the driving motor 34 is caused to oscillate together with the motor mount 38 as one unit in the vehicular front-rear direction, and therefore functions as a dynamic damper in the vehicular front-rear direction via the front-rear direction coil springs 64 and the front-rear direction absorbers 66.

In the construction where the tire wheel 12 is rotated by the driving motor 34 as in this embodiment, the unsprung mass of the vehicle increases by the amount of mass of the driving motor 34. If in that case, the driving motor 34 is not relatively displaceable with respect to the tire wheel 12 in the vehicular front-rear directions and the vehicular up-down direction, but is integrally fixed to the tire wheel 12, the driving motor 34 is displaced together with the tire wheel 12 as one unit with respect to the vehicle body when there is an input from the road surface to the tire wheel 12. Therefore, the performance of the tire wheel 12 in following the road surface during the running of the vehicle deteriorates, and the passenger riding comfort degrades. The increased unsprung mass also causes a conspicuous drawback of degraded maneuverability of the vehicle. Therefore, the tire wheel structure 10 of this embodiment has a feature in avoiding the adverse effect of the increase in the unsprung mass associated with the presence of the driving motor 34 at the time of an input to the tire wheel 12 as mentioned above.

Figure 3:
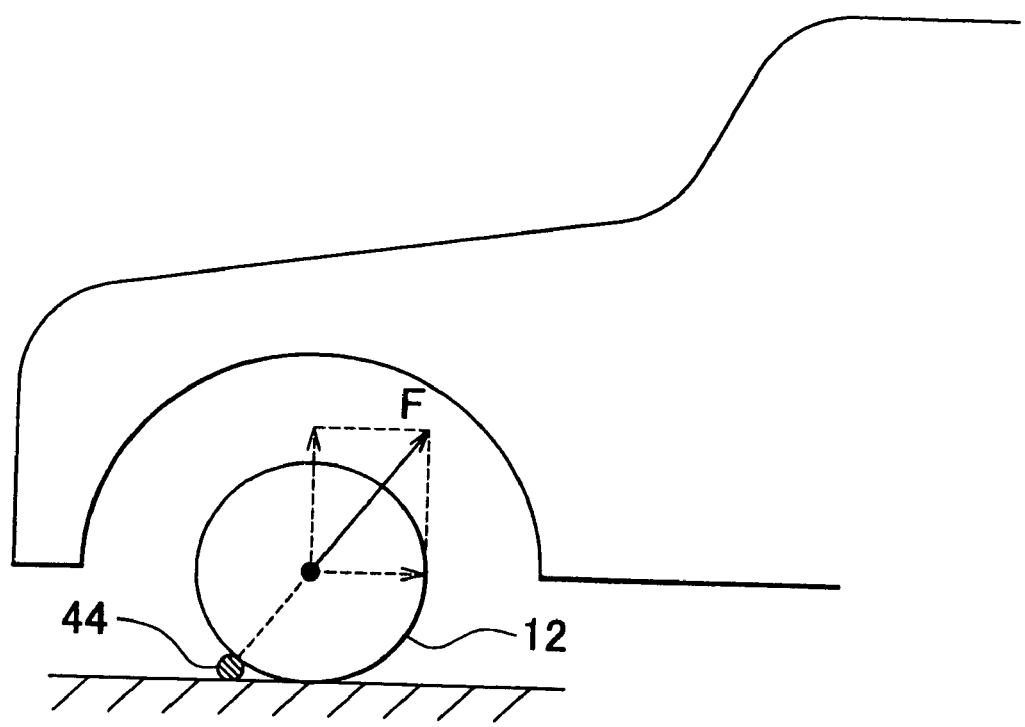
FIG. 3 is a diagram for explaining advantages of the tire wheel structure of the embodiment.

FIG. 3 shows a diagram for explaining an advantage of the tire wheel structure 10 of this embodiment. In the tire wheel structure 10 of the embodiment, the driving motor 34 is supported by the knuckle member 20 and therefore by the tire wheel 12 so as to be relatively displaceable with respect to the tire wheel 12 as described above. Relative displacements of the driving motor 34 with respect to the tire wheel 12 are permitted in a direction along the guide 39, that is, a direction along the axis that is inclined with respect to a vertical axis in the vehicular front-rear direction. Since the driving motor 34 is connected to the tire wheel 12 via the flexible coupling 36, driving force can be transferred from the driving motor 34 to the tire wheel 12 even if the shaft center of the driving motor 34 and the shaft center of the tire wheel 12 deviate from each other. In the aforementioned relative displacement permitted direction, the coil springs 40 and the absorbers 42 extend as spring elements and damper elements, respectively.

In this construction, the driving motor 34 functions as a dynamic damper with regard to the input to the tire wheel 12 from the road surface or the like. Specifically, when the tire wheel 12 moves up and down with respect to the vehicle body, the driving motor 34 is caused to oscillate together with the motor mount 38 as one unit in an up-down direction, and therefore performs a function as a dynamic damper in that direction. When the tire wheel 12 is displaced with respect to the vehicle body in the vehicular front-rear direction, the driving motor 34 is caused to oscillate together with the motor mount 38 as one unit in the vehicular front-rear direction, and therefore performs a function as a dynamic damper in that direction.

As indicated in FIG. 3, when the tire wheel 12 runs over an obstacle 44, such as a stone or the like, the tire wheel 12 receives, on an obstacle-contacting surface, a force F that acts in a diagonally upward direction that is slightly inclined with respect to a vertical axis. In the tire wheel structure 10 of this embodiment, relative displacements of the driving motor 34 with respect to the tire wheel 12 are permitted along an axis that is inclined in the vehicular front-rear direction, with an upper portion of the axis being positioned rearward of a vertical axis and a lower portion of the axis being positioned forward of the vertical axis. In this construction, the direction of the force F input to the tire wheel 12 can be adjusted so as to coincide with the direction of relative displacements of the driving motor 34 with respect to the tire wheel 12, by appropriately setting the angle α of the aforementioned inclined axis with respect to a vertical axis. Therefore, it is possible to effectively realize a dynamic damper effect on the input to the tire wheel 12 in the aforementioned diagonally upward direction.

Incidentally, since the driving motor 34 is connected to the tire wheel 12 via the flexible coupling 36, driving force is precisely transferred from the driving motor 34 to the tire wheel 12.

In the tire wheel structure 50 of the embodiment, relative displacements of the driving motor 34 with respect to the tire wheel 12 are permitted in the up-down direction and the vehicular front-rear direction. Therefore, by appropriately setting the relationship between the up-down direction spring elements and the vehicular front-rear direction spring elements and the relationship between the up-down direction damper elements and the vehicular front-rear direction damper elements, it is possible to effectively realize a dynamic damper effect when the force F is input from the contact surface to the tire wheel 12 in a diagonally upward direction as indicated in FIG. 3. Incidentally, since the driving motor 34 is connected to the tire wheel 12 via the flexible coupling 36, driving force is precisely transferred from the driving motor 34 to the tire wheel 12.

Since the driving motor 34 is relatively displaceable with respect to the tire wheel 12 in the up-down direction and the vehicular front-rear direction, the driving motor 34 is able to sufficiently function as a dynamic damper for the input to the tire wheel 12 in such an inclined direction. Therefore, the tire wheel structure 50 of the first embodiment is able to effectively reduce the vibrations caused on the vehicle body when there is an input to the tire wheel 12 from the road surface during the running of the vehicle. Therefore, the vehicle passenger riding comfort will improve, and the maneuverability of the vehicle will improve. Hence, the tire wheel structure 50 of this embodiment is also able to avoid or minimize the effect of the increase in the unsprung mass associated with the presence of the driving motor 34 at the time of an input to the tire wheel 12 from the road surface.

In the first embodiment, the up-down direction coil springs 60 and the front-rear direction coil springs 64 correspond to the "spring element" described in the appended claims, and the up-down direction absorbers 62 and the front-rear direction absorbers 66 correspond to the "damper element" described in the appended claims.

A second embodiment of the invention will next be described.

Figure 4:
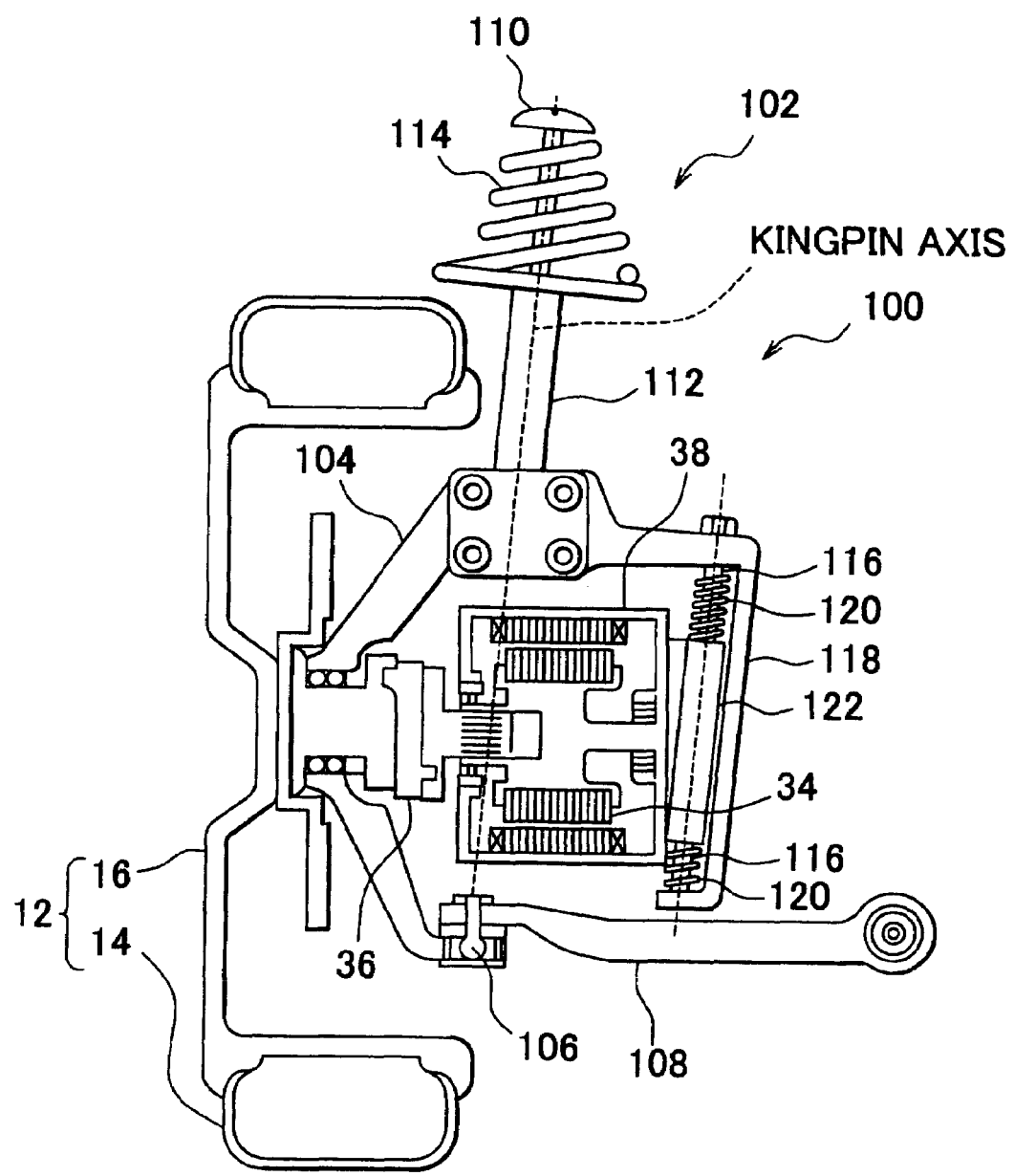
FIG. 4 is a diagram illustrating a construction of a tire wheel structure in accordance with a second embodiment of the invention, viewed from a front of a vehicle.

FIG. 4 shows a view of a tire wheel structure 100 in accordance with the second embodiment taken from a front of a vehicle. In FIG. 4, portions comparable to those shown in FIGS. 1 and 2 are represented by comparable reference numerals, and will not be described below, or will be described only briefly.

In this embodiment, the vehicle is equipped with a tire wheel structure 100 that includes a tire wheel 12 that is rotated and steered. In the tire wheel structure 100, a MacPherson strut suspension 102 is interposed between the tire wheel 12 and a vehicle body. A wheel 16 of the tire wheel 12 is rotatably supported by a knuckle member 104 that constitutes the suspension 102. The knuckle member 104 is supported for oscillating movements by a lower arm 108 via a suspension ball joint 106. Furthermore, the knuckle member 104 is supported for oscillating movements by a shock absorber 112 that is pivotably connected to the vehicle body via a support 110. The suspension 102 has a coil spring 114 that is mounted along the shock absorber 112.

The tire wheel 12 is steered or turned about a kingpin axis that is defined along a line connecting between the suspension ball joint 106 and the connecting portion of the shock absorber 112 to the vehicle body. The shock absorber 112 and the coil spring 114 extend in parallel with the kingpin axis. The kingpin axis is slightly inclined toward an inner portion of the vehicle body with respect to a vertical axis so that an upper portion of the kingpin axis, that is, the connecting portion of the shock absorber 112 to the vehicle body, is positioned slightly inward of a lower portion of the kingpin axis, that is, the suspension ball joint 106. In this case, the distance (kingpin offset) of the point of intersection between an extension of the kingpin axis and a road surface to the center of a road-contact surface of the tire wheel 12 is shorter than in the case where the kingpin axis is parallel to a vertical axis. Therefore, in the above-described case of the inclined kingpin axis, high steering stability can be secured.

The tire wheel structure 100 of this embodiment includes a driving motor 34 that drives the tire wheel 12 by transferring driving force to the tire wheel 12. A motor mount 38 to which the driving motor 34 is fixed is movably retained by a retainer member 118 via rod-shaped guides 116. The retainer member 118 is integrally fixed to a knuckle member 104. Each guide 116 has an axis that is substantially parallel to the kingpin axis of the suspension 102 needed for steering the tire wheel 12.

Coil springs 120 and absorbers 122 are provided as spring elements and damper elements, respectively, between the motor mount 38 and the retainer member 118. The coil springs 120 extend along the guides 116, that is, in parallel with the kingpin axis. Each coil spring 120 extends surrounding a corresponding guide 116. Each coil spring 120 has an elasticity in the direction parallel to the kingpin axis. The absorbers 122 extend parallel to the guides 116, that is, extend parallel to the kingpin axis. The absorbers 122 have a characteristic of damping vibrations in a direction parallel to the kingpin axis.

The motor mount 38 and the driving motor 34 in the tire wheel structure 100 of the embodiment are elastically supported by the retainer member 118, that is, by the tire wheel 12 integrated with the knuckle member 104, via the spring elements and the damper elements. Due to this construction, the motor mount 38 and the driving motor 34 are relatively displaceable along an axis parallel to the kingpin axis, with respect to the tire wheel 12 and the suspension (axle) 102 that includes the knuckle member 104.

In this construction, the driving motor 34 functions as a dynamic damper with regard to the input to the tire wheel 12 from the road surface or the like. Specifically, when the tire wheel 12 and vehicle body are relatively displaced with respect to each other via the coil spring 114 and the shock absorber 112, the driving motor 34 is caused to oscillate together with the motor mount 38 as one unit in the direction of extension of the coil spring 114 and the shock absorber 112, and therefore functions as a dynamic damper in that direction.

As described above, the tire wheel 12 is steered or turned about the kingpin axis passing through the suspension ball joint 106 and the connecting portion of the shock absorber 112 to the vehicle body. Furthermore, the driving motor 34 is movably supported by the retainer member 118 that is integrally fixed to the knuckle member 104 that rotatably supports the tire wheel 12. In this case, relative displacements of the driving motor 34 with respect to the tire wheel 12 are kept parallel to the kingpin axis regardless of the steered state of the tire wheel 12.

In the tire wheel structure 100 of the embodiment, relative displacements of the driving motor 34 with respect to the tire wheel 12 are always permitted along an axis that is parallel to the kingpin axis regardless of the steered state of the tire wheel 12. Therefore, the driving motor 34 effectively accomplishes a dynamic damper function when the driving motor 34 is relatively displaced with respect to the tire wheel 12. Incidentally, in this construction, the driving motor 34 is connected to the tire wheel 12 via the flexible coupling 36, so that driving force is precisely transferred from the driving motor 34 to the tire wheel 12.

Since the driving motor 34 is relatively displaceable with respect to the tire wheel 12 in a direction that is parallel to the kingpin axis, the driving motor 34 is able to sufficiently function as a dynamic damper when the driving motor 34 is relatively displaced with respect to the tire wheel 12. Therefore, the tire wheel structure 100 of the second embodiment is also able to effectively reduce the vibrations caused on the vehicle body in association with an input to the tire wheel 12 from the road surface or the like. Therefore, the vehicle passenger riding comfort will improve, and the maneuverability of the vehicle will improve. The tire wheel structure 100 of this embodiment is also able to avoid or minimize the effect of the increase in the unsprung mass associated with the presence of the driving motor 34 at the time of an input to the tire wheel 12 from the road surface, regardless of the steered state of the tire wheel 12.

In the second embodiment, the coil springs 120 correspond to the "spring element" described in the appended claims, and the absorbers 122 correspond to the "damper element" described in the appended claims.

A third embodiment of the invention will next be described.

Figure 5:
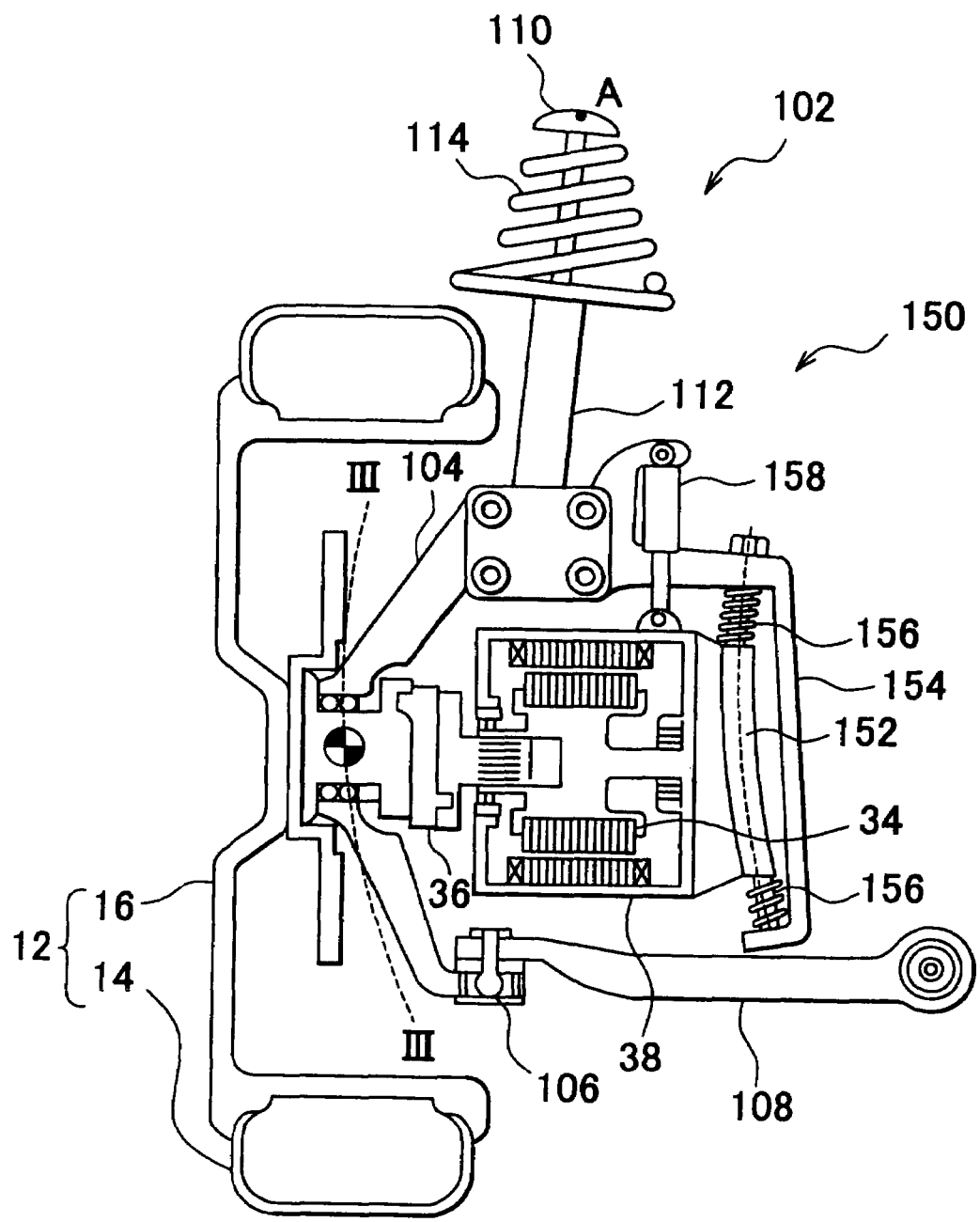
FIG. 5 is a diagram illustrating a construction of a tire wheel structure in accordance with a third embodiment of the invention, viewed from a front of a vehicle.

FIG. 5 shows a view of a tire wheel structure 150 in accordance with the third embodiment taken from a front of a vehicle. In FIG. 5, portions comparable to those shown in FIGS. 1, 2 and 4 are represented by comparable reference numerals, and will not be described below, or will be described only briefly.

In this embodiment, the vehicle is equipped with a tire wheel structure 150 that includes a tire wheel 12 that is rotated and steered. The tire wheel structure 150 has a driving motor 34 that drives the tire wheel 12 by transferring driving force to the tire wheel 12. A motor mount 38 to which the driving motor 34 is fixed is movably retained by a retainer member 154 via curved guides 152. The retainer member 154 is integrally fixed to the knuckle member 104.

Strictly speaking, the direction of oscillations of the suspension 102 is not a perfectly straight line in the up-down direction, but an arc III-III indicated by a broken line in FIG. 5 which has its center on the point of intersection of a plain extending from a connecting point A between the suspension 102 and the vehicle body in directions perpendicular to the direction of extension of the suspension 102 with a straight line passing through a connecting point of the lower arm 108 to the suspension ball joint 106 and a connecting point of the lower arm 108 to the vehicle body. The guide 152 has a curved line that is generally parallel to the arc III-III shown n FIG. 5, that is, a curved line extending substantially in the same direction as the direction of oscillations of the suspension 102.

Coil springs 156 and absorbers 158 are provided as spring elements and damper elements, respectively, between the motor mount 38 and the retainer member 154. The coil springs 156 extend in a curved shape along the guides 152. Each coil spring 156 extends surrounding a corresponding guide 152. Each coil spring 156 has an elasticity in the direction substantially equivalent to the direction of oscillations of the suspension 102. The absorbers 158 extend parallel to the direction of extension of the suspension 102, and have a characteristic of damping vibrations in that direction.

The motor mount 38 and the driving motor 34 in the tire wheel structure 150 of the embodiment are elastically supported by the retainer member 154, that is, by the tire wheel 12 integrated with the knuckle member 104, via the spring elements and the damper elements. The motor mount 38 and the driving motor 34 are relatively displaceable with respect to the tire wheel 12 and the suspension (axle) 102, along a curved line that is oriented substantially in the same direction as the direction of oscillations of the suspension 102.

In this construction, the driving motor 34 functions as a dynamic damper with regard to the input to the tire wheel 12 from the road surface or the like. Specifically, when the tire wheel 12 and vehicle body are relatively displaced with respect to each other via the coil spring 114 and the shock absorber 112, the driving motor 34 is caused to oscillate together with the motor mount 38 as one unit in the direction of oscillations of the suspension 102, and therefore functions as a dynamic damper in that direction.

In the tire wheel structure 150 of the embodiment, relative displacements of the driving motor 34 with respect to the tire wheel 12 are permitted on a curved line that is orientated substantially in the same direction as the direction of oscillations of the suspension 102. Therefore, the driving motor 34 effectively accomplishes a dynamic damper function when the driving motor 34 is relatively displaced with respect to the tire wheel 12. Incidentally, in this construction, too, the driving motor 34 is connected to the tire wheel 12 via the flexible coupling 36, so that driving force is precisely transferred from the driving motor 34 to the tire wheel 12.

Since the driving motor 34 is relatively displaceable with respect to the tire wheel 12 substantially in the same direction as the direction of oscillations of the suspension 102, the driving motor 34 is able to fully performs the function as a dynamic damper when the driving motor 34 is relatively displaced with respect to the tire wheel 12. Therefore, the tire wheel structure 150 of the third embodiment is also able to effectively reduce the vibrations caused on the vehicle body in association with an input to the tire wheel 12 from the road surface or the like. Therefore, the vehicle passenger riding comfort will improve, and the maneuverability of the vehicle will improve. Hence, the tire wheel structure 150 of this embodiment is also able to achieve maximum avoidance of the effect of the increase in the unsprung mass of the vehicle associated with the presence of the driving motor 34 at the time of an input to the tire wheel 12 from the road surface.

Furthermore, the driving motor 34 is relatively displaceable with respect to the tire wheel 12 in a direction substantially equivalent to the direction of oscillations of the suspension 102. Such a damper action of the driving motor 34 substantially prevents occurrence of undesired or unnecessary forces on the vehicle body. Therefore, the tire wheel structure 150 of the embodiment is able to reliably prevent occurrence of moments on the vehicle body in the yawing direction or pitching direction in association with relative displacement of the driving motor 34.

In the third embodiment, the coil springs 156 correspond to the "spring element" described in the appended claims, and the absorbers 158 correspond to the "damper element" described in the appended claims.

A fourth embodiment of the invention will next be described.

Figure 6:
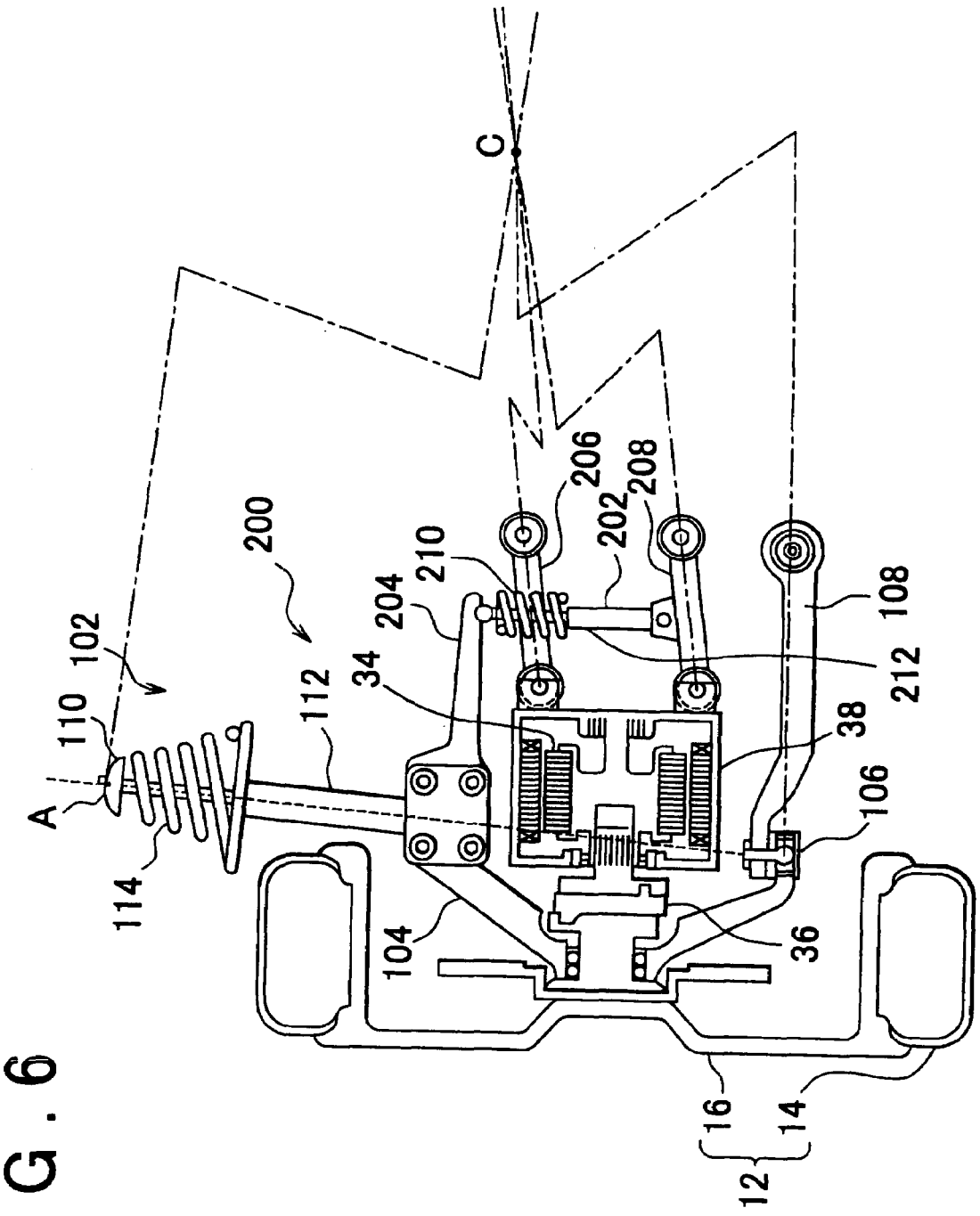
FIG. 6 is a diagram illustrating a construction of a tire wheel structure in accordance with a fourth embodiment of the invention, viewed from a front of a vehicle.

FIG. 6 shows a view of a tire wheel structure 200 in accordance with the fourth embodiment taken from a front of a vehicle. In FIG. 6, portions comparable to those shown in FIGS. 1, 2 and 4 are represented by comparable reference numerals, and will not be described below, or will be described only briefly.

In this embodiment, the vehicle is equipped with a tire wheel structure 200 that includes a tire wheel 12 that is rotated and steered. The tire wheel structure 200 has a driving motor 34 that drives the tire wheel 12 by transferring driving force to the tire wheel 12. A motor mount 38 to which the driving motor 34 is fixed is movably retained by a vehicle body via a first arm 206 connected to an upper portion of the motor mount 38, and a second arm 208 connected to a lower portion of the motor mount 38.

The point of intersection of a straight line passing through a connecting point of the first arm 206 to the motor mount 38 and a connecting point of the first arm 206 to the vehicle body and a straight line passing through a connecting point of the second arm 208 to the motor mount 38 and a connecting point of the second arm 208 to the vehicle body coincides with a point C of intersection of a plain extending from a connecting point A between a suspension 102 and the vehicle body in directions perpendicular to the direction of extension of the suspension 102 and a straight line passing through a connecting point of a lower arm 108 to the vehicle body and a connecting point of the lower arm 108 to a suspension ball joint 106.

Coil springs 210 and absorbers 212 are provided as spring elements and damper elements, respectively, between the motor mount 38 and a retainer member 204 that is integrally fixed to a knuckle member 104. Each coil spring 210 extends along an absorber rod 202 and surrounds the absorber rod 202. Each coil spring 210 has an elasticity in a direction parallel to the direction of oscillations of the suspension 102 when the tire wheel 12 and the vehicle body are in a desired relative positional relationship (hereinafter, referred to as "normal position"). Each absorber 212 is connected to the retainer member 204 and to an intermediate portion of the second arm 208. Each absorber 212 has an axis that extends substantially parallel to the direction of oscillations of the suspension 102 at the time of the normal position of the tire wheel 12 and the vehicle body. Each absorber 212 has a characteristic of damping vibrations in that direction.

The motor mount 38 and the driving motor 34 in the tire wheel structure 200 of the embodiment are elastically supported by the retainer member 204, that is, by the tire wheel 12 integrated with the knuckle member 104, via the spring elements and the damper elements. The motor mount 38 and the driving motor 34 are relatively displaceable with respect to the tire wheel 12 and the suspension (axle) 102, along a circular orbit whose center coincides with the center of oscillation rotation of the suspension 102 at the time of the normal position of the tire wheel 12 and the vehicle body. When the tire wheel 12 and the vehicle body are in the normal position, the instantaneous rotation center of relative displacements of the driving motor 34 with respect to the tire wheel 12 substantially coincides with the instantaneous rotation center of relative displacements of the tire wheel 12 with respect to the vehicle body, that is, the instantaneous oscillation rotation center of the suspension 102.

In this construction, the driving motor 34 functions as a dynamic damper with regard to the input to the tire wheel 12 from the road surface or the like. Specifically, when the tire wheel 12 and vehicle body are relatively displaced with respect to each other via the coil spring 114 and the shock absorber 112, the driving motor 34 is caused to oscillate together with the motor mount 38 as one unit in the direction of oscillations of the suspension 102, and therefore functions as a dynamic damper in that direction.

In the tire wheel structure 200 of the embodiment, relative displacements of the driving motor 34 with respect to the tire wheel 12 are permitted on a circular orbit whose center coincides with the oscillation rotation center of the suspension 102. Therefore, the driving motor 34 effectively accomplishes a dynamic damper function when the driving motor 34 is relatively displaced with respect to the tire wheel 12. Incidentally, in this construction, the driving motor 34 is connected to the tire wheel 12 via the flexible coupling 36, so that driving force is precisely transferred from the driving motor 34 to the tire wheel 12.

Since the driving motor 34 is relatively displaceable with respect to the tire wheel 12 along the circular orbit whose center coincides with the oscillation rotation center of the suspension 102, the driving motor 34 is able to fully perform the function as a dynamic damper when the driving motor 34 is relatively displaced with respect to the tire wheel 12. Therefore, the tire wheel structure 200 of the fourth embodiment is also able to effectively reduce the vibrations caused on the vehicle body in association with an input to the tire wheel 12 from the road surface or the like. Therefore, the vehicle passenger riding comfort will improve, and the maneuverability of the vehicle will improve. The tire wheel structure 200 of this embodiment is also able to achieve maximum avoidance of the effect of the increase in the unsprung mass of the vehicle associated with the presence of the driving motor 34 at the time of an input to the tire wheel 12 from the road surface.

Furthermore, the driving motor 34 is relatively displaced with respect to the tire wheel 12 along the circular orbit whose center coincides with the oscillation rotation center of the suspension 102. Such a damper action of the driving motor 34 substantially prevents occurrence of undesired or unnecessary forces on the vehicle body. Therefore, similar to the tire wheel structure 150 of the third embodiment, the tire wheel structure 200 of the embodiment is able to reliably prevent occurrence of moments on the vehicle body in the yawing direction or pitching direction in association with relative displacement of the driving motor 34.

In the fourth embodiment, the coil springs 210 correspond to the "spring element" described in the appended claims, and the absorbers 212 correspond to the "damper element" described in the appended claims.

In the first to fourth embodiments, the driving motor that drives the tire wheel by transferring driving force to the tire wheel is an electric motor that is rotated by using electric power supplied from the electric power source. However, the invention is not limited to this construction. For example, the driving motor may be a hydraulic motor or an air motor that is mechanically driven by flows of an oil or air.

Furthermore, in the first to fourth embodiments, the tire wheel structure 10 includes the tire wheel 12 that is steered. However, the invention is also applicable to a tire wheel structure in which the tire wheel is not steered. In this case, the driving motor 34 that drives the tire wheel 12 is supported by unsprung component parts, such as the wheel 16, the suspension (axle), etc., so as to be relatively displaceable with respect to the tire wheel 12.

Still further, although in the first to fourth embodiments, the suspension is of double wishbone type or of strut type, other types of suspensions may also be used. In such a case, the driving motor 34 that drives the tire wheel 12 is supported by unsprung component parts, such as the wheel 16, the suspension (axle), etc., so as to be relatively displaceable with respect to the tire wheel 12.

Yet further, in the first to fourth embodiments, relative displacements of the driving motor 34 with respect to the tire wheel 12 are permitted in the up-down direction and the vehicular front-rear direction, or are permitted in the direction of oscillations of the suspension. However, structures of any two or more of the foregoing embodiments may be suitably combined so as to set the direction of relative displacements of the driving motor 34 with respect to the tire wheel 12.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A tire wheel structure comprising:
   a tire wheel supported by a vehicle body; and
   a driving motor which is disposed near the tire wheel and which is supported on the tire wheel via a spring element and a damper element so as to be relatively displaceable with respect to the tire wheel, the driving motor driving the tire wheel by transferring driving force thereto, wherein the driving motor is supported so as to be relatively displaceable with respect to the tire wheel that is a steered wheel in a direction that is parallel with a kingpin axis of a suspension device that supports the tire wheel on the vehicle body.

2. The tire wheel structure according to claim 1, wherein the spring element is a coil spring, and the damper element is an absorber.

3. The tire wheel structure according to claim 1, wherein the spring element is provided separately from the damper element.

4. The tire wheel structure according to claim 1, wherein the driving motor is supported so as to be relatively displaceable with respect to the tire wheel in both a vertical axis direction and a vehicular front-rear direction.

5. The tire wheel structure according to claim 1, wherein the driving motor is supported so as to be relatively displaceable with respect to the tire wheel in a direction that is substantially the same as a direction of oscillation of the suspension device that supports the tire wheel on the vehicle body.

6. The tire wheel structure according to claim 1, wherein the driving motor is supported so as to be relatively displaceable with respect to the tire wheel along a circular orbit having a center that is aligned with an oscillation rotation center of the suspension device that supports the tire wheel on the vehicle body.

7. The tire wheel structure according to claim 1, wherein the driving motor is mounted on and fixed to a motor mount, and is supported so as to be relatively displaceable together with the motor mount with respect to the tire wheel.

8. The tire wheel structure according to claim 3, wherein the spring element is a coil spring, and the damper element is an absorber.

* * * * *